G. ROHRBACH.

DETACHABLE AND ADJUSTABLE BRUSH HANDLE.

APPLICATION FILED MAR. 31, 1916.

Reissued June 20, 1916. 14,156.

WITNESSES:

Charles Pickles

Thos. Castberg

INVENTOR

Gabriel Rohrbach

BY Strong & Townsend

ATTORNEYS

THE COLUMBIA PLANOGRAPH CO., WASHINGTON, D. C.

UNITED STATES PATENT OFFICE.

GABRIEL ROHRBACH, OF SAN FRANCISCO, CALIFORNIA.

DETACHABLE AND ADJUSTABLE BRUSH-HANDLE.

14,156. Specification of Reissued Letters Patent. Reissued June 20, 1916.

Original No. 1,158,856, dated November 2, 1915, Serial No. 43,571. Application for reissue filed March 31, 1916. Serial No. 88,175.

*To all whom it may concern:*

Be it known that I, GABRIEL ROHRBACH, a citizen of the United States, residing in the city and county of San Francisco and State of California, have invented new and useful Improvements in Detachable and Adjustable Brush-Handles, of which the following is a specification.

This invention relates to a detachable and adjustable brush handle.

The object of the present invention is to provide a simple, substantial, cheaply manufactured handle for brushes and like devices, which may be quickly and easily attached or detached with relation to the brush, and also adjusted to any angular position.

The invention consists of the parts and the combination and construction of parts as hereinafter more fully described and claimed, having reference to the accompanying drawings, in which—

Figure 1:
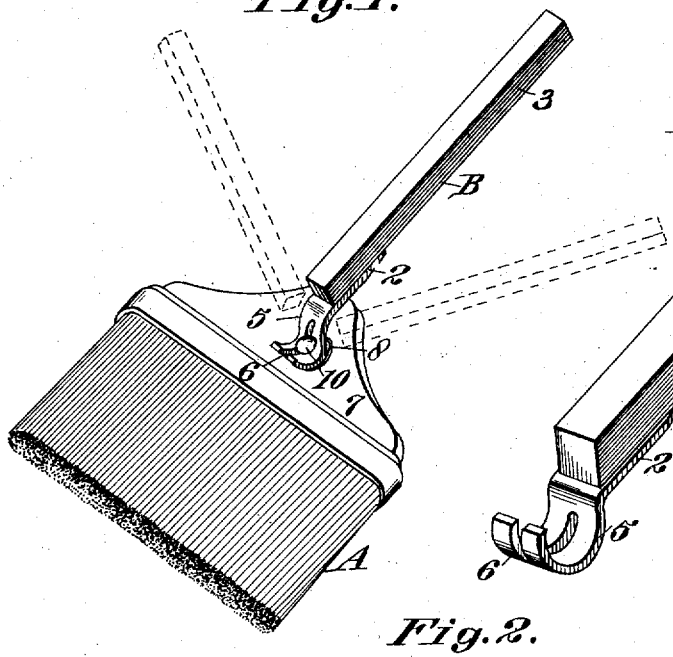
Figure 3:
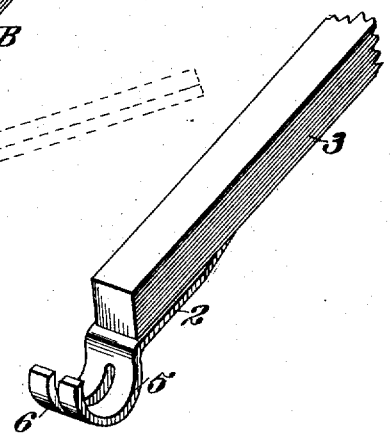
Figure 2:
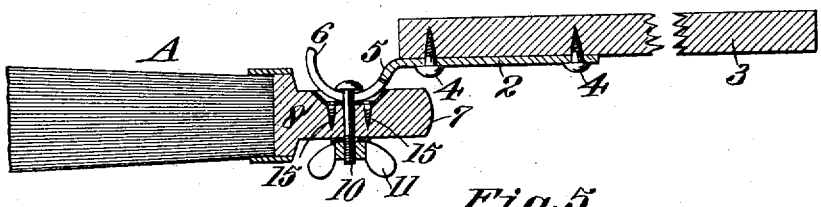
Figure 5:
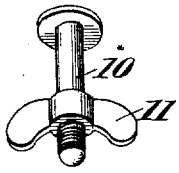
Figure 4:
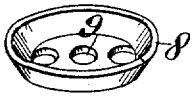

Figure 1 is a perspective view of a standard form of the brush, showing the application of the handle. Fig. 2 is a central longitudinal sectional view of Fig. 1. Fig. 3 is a perspective view of a detachable handle. Fig. 4 is a perspective view of the socket washer. Fig. 5 is a view of the bolt and nut, by which the handle as a whole is secured.

Referring to the drawings in detail, A indicates a standard form of brush, such as is used for painting, whitewashing, dusting and similar purposes. This is secured to the detachable and adjustable handle, generally indicated at B; which forms the subject-matter of the present invention. This handle consists of a metal section comprising a shank 2 and a wooden handle 3 of any shape and length, which is secured by screws 4 or any other suitable means. The other end of the metal section is bent to form a semicircle 5 and slotted, as at 6; in this manner forming a bent fork. The handle comprising the curved fork, shank, and the handle 3 is attached to the head of the brush indicated at 7 in the following manner: The head stock 7 has a rear extension that is perforated and counterbored on one side to receive a socket washer 8, which is centrally perforated, as at 9, this permitting a bolt 10 to pass through the slotted fork perforation and the head 7 of the brush, said bolt being secured by means of a wing nut 11. The attaching means comprising the dish or socket washer 8 and the bolt 10, permits the handle proper, with connected fork to be securely attached to the head of the brush and also permits the handle to be turned in any direction, both laterally and angularly to the plane of the bristles, the former, as shown by the different dotted line positions, (see Fig. 1).

The proportions of a handle as here shown, permits brushes to be manufactured cheaper than has heretofore been possible, as the amount of wood employed in the head of the brush may be considerably reduced. It, furthermore, reduces the expense of the brush, as one handle may be used for any number of brushes of different sizes and makes, thus eliminating the price of the handle with each purchase of a brush. The adjustable manner of attaching the handle also saves the hair or the bristles from excessive wear, as the handle may be swung into a position where the brush proper may be most efficiently worked or applied to the surface to be covered.

The detachable and adjustable handle is simple and rigid in construction, can be quickly attached or detached and also adjusted to any suitable position.

For the purpose of preventing the socket washer from becoming lost, it is preferably secured to the brush head by means of screws 15.

It will be seen that the shape and angle of the depression of the socket 8 are such that the back of the curved plate 5 will be supported upon the peripheral edges of the socket and at the center of the socket, where it is secured by the bolt 10. Thus a four-point support provided by the circular socket rim, allows the handle to be turned to any angle parallel with the brush head length, in either direction, so that it may be secured parallel with the length of the brush head, and it may also be rocked transversely to the brush without changing the bearing points. When however, the wing-nut of bolt 10 is operated to an extent to draw the curved shank into engagement with the bottom of the washer 8, it will be apparent that a six-point engagement between the shank and the washer exists, namely by virtue of the shank being bifurcated and engaging the washer at three-points on each side of its bifurcation.

The materials and finish of the several parts of the device are such as the experience and judgment of the manufacturer may dictate.

I wish it understood that various changes in form, proportions, and minor details of construction may be resorted to within the scope of the appended claims, and that I do not wish to limit myself to the specific design and construction here shown.

Having thus described my invention, what I claim and desire to secure by Letters Patent is—

1. In combination with a brush head having a circular depression therein, a socket washer secured in said depression and having a circular rim engaged by the circular wall formed by the depression so as to support the rim against movement, a handle having a metal shank which latter has a curved end engaged in the washer, said shank being formed with a central longitudinal slot which extends completely through the free end of the shank, and a bolt passed through said slot, washer and brush head.

2. In combination with a brush head, a central extension projecting rearwardly from the head, a washer secured to the extension and having a circular outstanding rim, a handle having a shank that is curved and slotted and which is received in the washer so as to uniformly engage the rim at any point throughout the latter, and a bolt for securing the shank to the head.

3. As a new article of manufacture, a brush head for use with handles having curved shanks composed of a body having a central contracted extension projecting rearwardly therefrom, a washer secured to the extension and having a circular out-standing rim so as to receive the curved shank in the washer and to permit the shank to uniformly engage the rim at any point throughout the latter, said washer and extension having registering central apertures to receive fastening means for connecting the shank to the head.

In testimony whereof I have hereunto set my hand in the presence of two subscribing witnesses.

GABRIEL ROHRBACH.

Witnesses:
FRANCES V. COLE,
JOHN H. HERRING.

Copies of this patent may be obtained for five cents each, by addressing the "Commissioner of Patents Washington, D. C."